(12) United States Patent
Jamil et al.

(10) Patent No.: US 9,026,769 B1
(45) Date of Patent: May 5, 2015

(54) DETECTING AND REISSUING OF LOOP INSTRUCTIONS IN REORDER STRUCTURE

(75) Inventors: Sujat Jamil, Gilbert, AZ (US); R. Frank O'Bleness, Tempe, AZ (US); Joseph Delgross, Chandler, AZ (US); Tom Hameenanttila, Phoenix, AZ (US)

(73) Assignee: Marvell International Ltd., Hamilton (BM)

( * ) Notice: Subject to any disclaimer, the term of this patent is extended or adjusted under 35 U.S.C. 154(b) by 630 days.

(21) Appl. No.: 13/357,567

(22) Filed: Jan. 24, 2012

Related U.S. Application Data

(60) Provisional application No. 61/437,969, filed on Jan. 31, 2011.

(51) Int. Cl.
*G06F 9/38* (2006.01)
*G06F 9/32* (2006.01)

(52) U.S. Cl.
CPC ............ *G06F 9/3855* (2013.01); *G06F 9/3836* (2013.01); *G06F 9/325* (2013.01)

(58) Field of Classification Search
CPC ...... G06F 9/30065; G06F 9/381; G06F 9/325
USPC ............................... 712/241, E9.078, E9.058
See application file for complete search history.

(56) References Cited

U.S. PATENT DOCUMENTS

| | | | |
|---|---|---|---|
| 6,934,865 B2 * | 8/2005 | Moritz et al. ................. 713/324 |
| 6,938,150 B2 * | 8/2005 | Fukagawa .................... 712/218 |
| 7,475,231 B2 | 1/2009 | Tran | |
| 2002/0178350 A1 | 11/2002 | Chung et al. | |
| 2004/0268335 A1 * | 12/2004 | Martin et al. ................. 717/161 |
| 2007/0113057 A1 | 5/2007 | Knoth | |
| 2007/0113058 A1 | 5/2007 | Tran et al. | |

OTHER PUBLICATIONS

Tubella, Jordi et al., Control Speculation in Multithreaded Processors through Dynamic Loop Detection, Universitat Politecnica de Catalunya, Barcelona, Spain, 10 pages, Feb. 1998.
Hu, J.S. et al., Scheduling Reusable Instructions for Power Reduction, The Pennsylvania State University, Pennsylvania, USA, 6 pages, 2004.

* cited by examiner

*Primary Examiner* — Kenneth Kim

(57) ABSTRACT

A processor for processing loop instructions can include an instruction reorder structure and a loop processing controller. The instruction reorder structure is configured to store decoded instructions according to program order and issue the decoded instructions for execution out of program order. The loop processing controller is configured to detect a loop in the decoded instructions stored in the instruction reorder structure and cause the instruction reorder structure to reissue the decoded instructions that form the loop for re-execution.

20 Claims, 4 Drawing Sheets

DETECTING AND REISSUING OF LOOP INSTRUCTIONS IN REORDER STRUCTURE

CROSS-REFERENCE TO RELATED APPLICATIONS

This disclosure claims priority to U.S. Provisional Application No. 61/437,969 filed on Jan. 31, 2011, the disclosure of which is incorporated herein by reference in its entirety.

BACKGROUND

The present disclosure relates generally to processors that execute instructions out of program order, and specifically to processing of loop instructions within such processors.

Processors execute programs which are typically represented as ordered sequences of instructions. A processor generally stores instructions in an instruction cache prior to processing the instructions. When the processor is ready to process the instructions, the instructions are fetched from the instruction cache and transferred to a pipeline. The pipeline is responsible for decoding and executing the instructions, and storing results of the instructions in a suitable storage unit, such as a register or a memory.

In order to maximize computational throughput and increase performance, processors issue and execute multiple instructions per clock cycle. A technique for increasing the number of instructions executed per clock cycle involves executing instructions out of program order. In a processor that executes instructions out of program order (referred to herein as "an out-of-order processor"), the instructions are typically fetched from the instruction cache and decoded in program order. The out-of-order processor then executes the instructions in an order governed by the availability of input data, rather than by their original program order. While a processor that executes instructions in program order or according to program order (referred to herein as "in-order processors") strictly perform instructions, such as fetch, decode, execute, and retire instructions, in program order, out-of-order processors have various degrees of freedom in reordering many of these steps, while maintaining the illusion of program order.

When a processor encounters loop instructions, the instructions within the loop routine are fetched by the processor from the instruction cache and decoded for execution, and the same instructions are fetched and decoded in subsequent iterations of the loop. While executing the loop instructions out of order may improve overall instruction throughput, the throughput is still limited by an ability of the processor to fetch and decode the instructions. Typically, the number of instructions that the processor can fetch and decode in parallel is limited by the output bandwidth of the instruction cache and is significantly less than the number of instructions that the processor can execute in parallel. Furthermore, the instruction cache is always enabled to be able to provide the instructions as quickly as possible, which enablement consumes a significant amount of the total power of the processor. The performance of the processor during execution of loop instructions can thus be degraded in terms of speed and power consumed because of frequent access to the same instructions from the instruction cache.

SUMMARY

In general, in one aspect, this specification describes an out-of-order processor that includes i) an instruction reorder structure and ii) a loop processing controller. The instruction reorder structure is configured to store decoded instructions according to program order and issue the decoded instructions for execution out of program order. The loop processing controller is configured to detect a loop in the decoded instructions stored in the instruction reorder structure and cause the instruction reorder structure to reissue the decoded instructions that form the loop for re-execution. This may improve performance of the processor by enabling a sustained parallel execution rate of the instructions without being limited by instruction fetch, decode, or dispatch resources.

Some implementations may include disabling (e.g., placing a lower power mode of operation, powering off, and so on) a component that provides instructions to the instruction reorder structure while loop instructions are re-executed from the instruction reorder structure. This may reduce power consumed by the instruction fetch, decode, or dispatch resources when executing the loop instructions from the instruction reorder structure.

Details of one or more implementations are set forth in the accompanying drawings and the description below. Other features and advantages may be apparent from the description and drawings, and from the claims.

DETAILED DESCRIPTION

Figure 1:
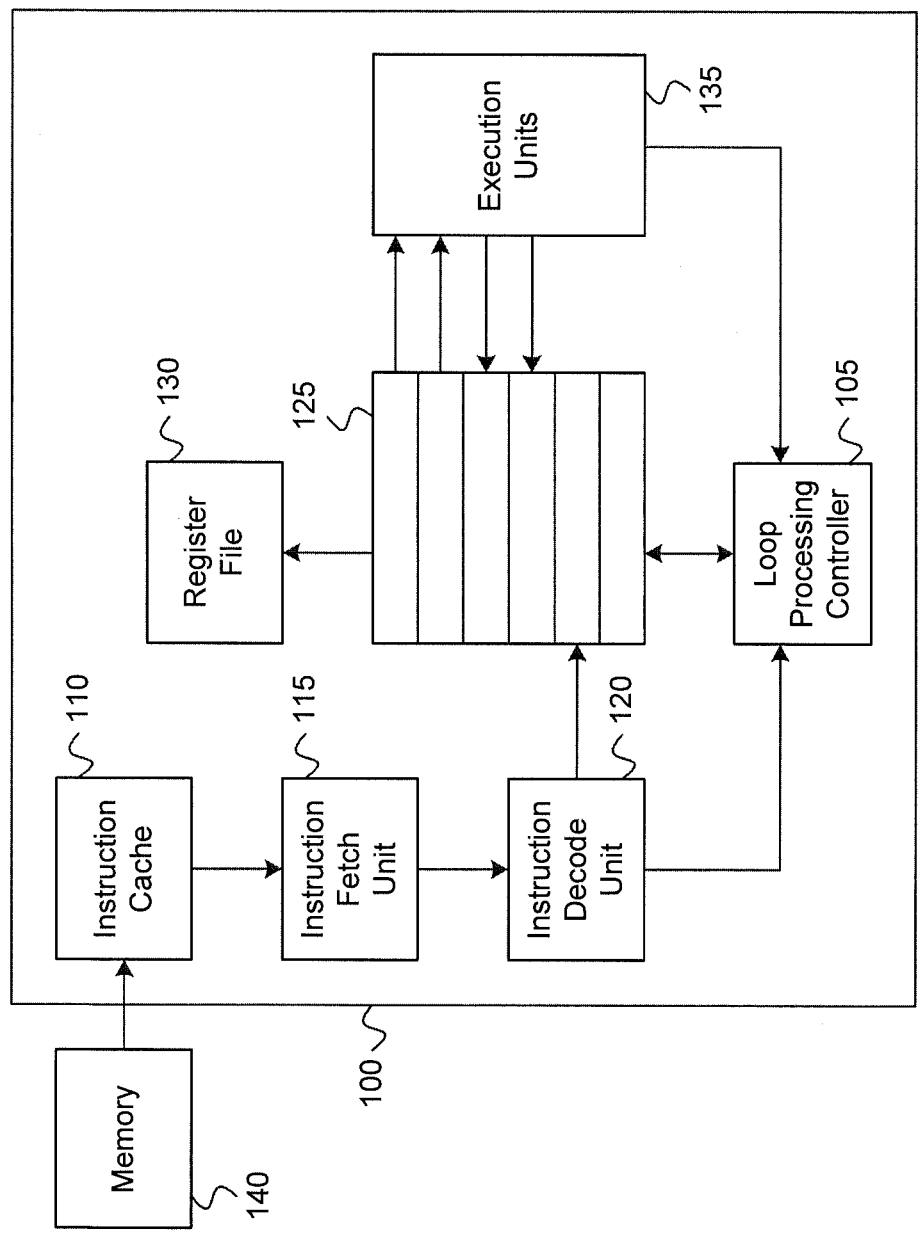
FIG. 1 is a block diagram of an example of a processor with an instruction reorder structure and a loop processing controller.

Various implementations of the present disclosure are discussed below in conjunction with an example of an out-of-order processor 100, as shown in FIG. 1. The term "processor" as used herein includes any device in which instructions retrieved from a memory or other storage element are executed using one or more execution units. Examples of processors may therefore include microprocessors, central processing units (CPUs), very long instruction word (VLIW) processors, single-issue processors, multi-issue processors, digital signal processors, application-specific integrated circuits (ASICs), and other types of data processing devices. It should be understood, however, that the systems and techniques described herein are generally applicable to any processor or processing system in which it is desirable to detect and execute loop instructions so as to improve the performance of the processor. Accordingly, FIG. 1 corresponds to some implementations of a processor, and other processor implementations may include components different than those shown in FIG. 1.

FIG. 1 is a block diagram of the processor 100 in which a loop processing controller 105 may be utilized to control the processing of loop instructions. The processor 100 may include an instruction cache 110, an instruction fetch unit 115, an instruction decode unit 120, an instruction reorder structure 125, a register file 130, and execution units 135. Execution units 135 may include an arithmetic logic unit (ALU), a memory management unit (MMU), an integer unit, a floating point unit, a branch unit, a multiplication unit, a division unit, and other functional units that perform operations or calculations on data.

The processor may be configured to execute instructions stored in memory 140. Instructions are loaded from the memory 140 into the instruction cache 110, which may be a high speed cache memory that temporarily stores instructions. The instruction fetch unit 115 may provide instructions from the instruction cache 110 to the instruction decode unit 120. The instruction decode unit 120 receives instructions from the instruction fetch unit 115, decodes the instructions, and provides the decoded instructions to the instruction reorder structure 125.

The instruction reorder structure 125 stores the instructions received from the instruction decode unit 120 and keeps track of the original program order of the instructions as the instructions are issued out of program order to the execution units 135. The instruction reorder structure 125 contains the instructions that are in flight, e.g., the instructions that have been dispatched by the decode unit 120 but not yet completed architecturally. These include instructions that are waiting to be issued to the execution units 135, instructions that are executing in the execution units 135, and instructions that have finished execution but are waiting to be completed in program order.

Figure 2:
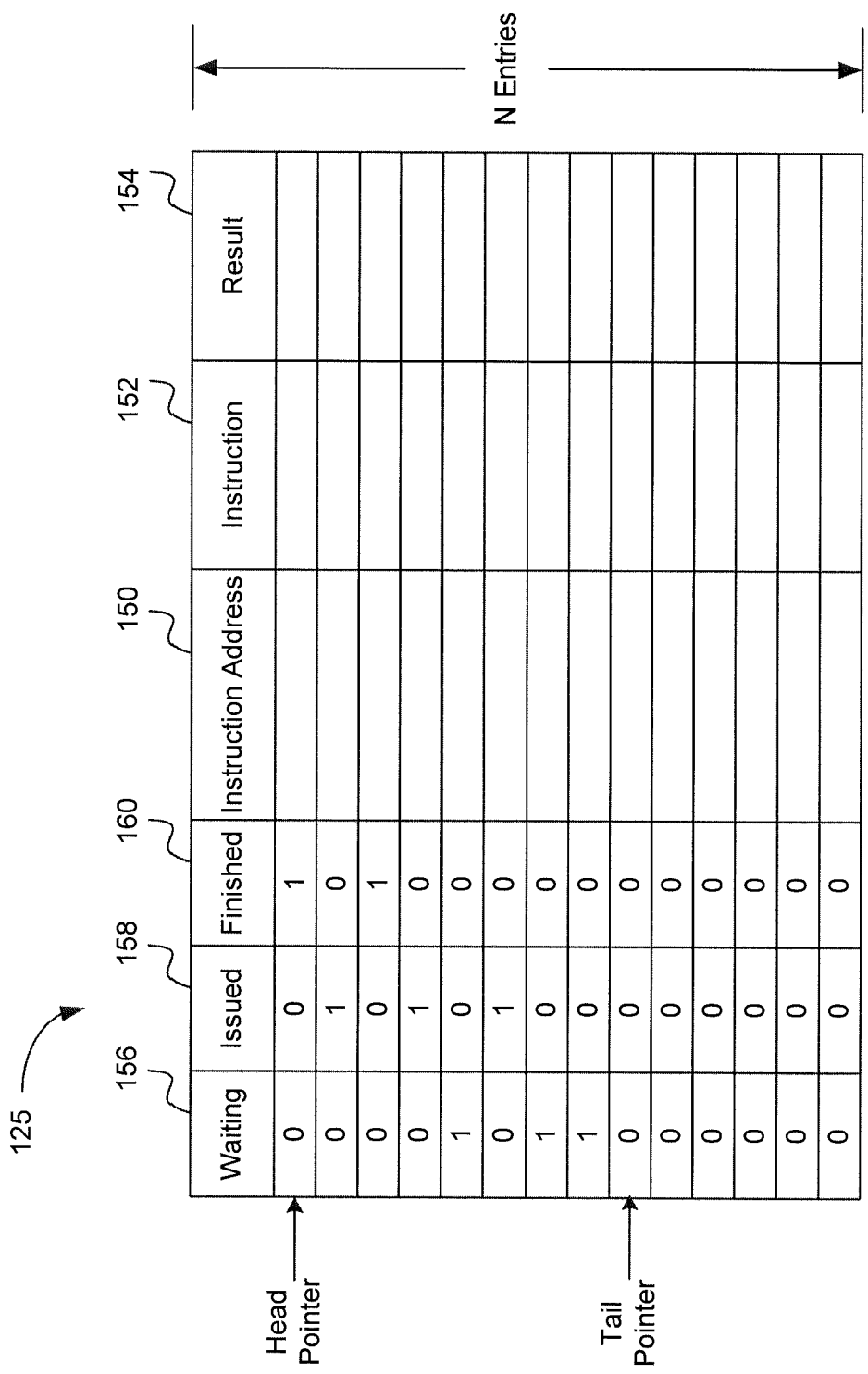
FIG. 2 is an example of the instruction reorder structure.

FIG. 2 shows an example of the instruction reorder structure 125 that may be used to store the instructions that are in flight. The instruction reorder structure 125 may be implemented as a reorder buffer, a reorder queue, a memory order buffer (MOB), a completion buffer, or other data structure that tracks the program order of the instructions in flight. The instruction reorder structure 125 may include a number of entries, or storage locations, N that are used to store dispatched instructions. Each entry may include an instruction address field 150 for storing an instruction address, an instruction field 152 for storing an instruction, and a result field 154 for storing a result tag of instructions waiting to be executed or a result of executed instructions. In some implementations, the reorder structure 125 may be a circular buffer containing 64 entries. However, the reorder structure 125 may contain any number of entries in different implementations. For example, the reorder structure 125 may contain a number of entries that is determined to accommodate 95% of all loop sizes.

The status of each instruction in the reorder structure 125 can be tracked using bits in each entry of the reorder structure 125. These bits may include a waiting bit 156, an issued bit 158, and a finished bit 160. The waiting bit 156 indicates whether the instruction in the entry is waiting for execution. The issued bit 158 indicates whether the instruction in the entry is in execution. The finished bit 160 indicates whether the instruction in the entry has finished execution. These bits are updated as an instruction traverses from one state to the next. The reorder structure 125 may include other fields and bits as an alternative or in addition to the fields and bits shown in FIG. 2. For example, the reorder structure 125 may include one or more bits to indicate whether an instruction is speculative and to identify which speculative basic block an instruction belongs to. As another example, the reorder structure 125 may contain a rename register field to store the rename register associated with the instruction.

To keep track of the original program order of the instructions, the instruction reorder structure 125 maintains an ordered list of the instructions. The reorder structure 125 may be managed using a head pointer and a tail pointer. When a reorder structure entry is allocated to an instruction that is dispatched by the decode unit 120, the waiting bit 156 of the entry is asserted, and the tail pointer is advanced to the next available entry. One or more reorder structure entries may be allocated per cycle based on the number of instructions that are dispatched per cycle, which is limited by the dispatch bandwidth. The reorder structure 125 can issue instructions by conveying them to the execution units 135. As long as there are no dependencies between instructions, the reorder structure 125 allows multiple instructions to issue and execute out of order.

In some implementations, results of the executed instructions are written back to the instruction reorder structure 125. After an instruction is issued, the reorder structure 125 may continuously monitor tag bus(es) for result tags. When a tag on the tag bus matches a result tag in a result field 154 of an entry of the reorder structure 125, the result field 154 of the entry latches in a result forwarded by an execution unit 135, and the reorder structure 125 asserts the finished bit 160 of the entry. The results may be provided to the instruction reorder structure 125 in any order. The instruction reorder structure 125 stores each result with the instruction which generated the result until the instruction is ready for retirement or completion, e.g., when the instruction is selected for storing its result into a destination. The instructions are retired from the head of the reorder structure 125, as indicated by the head pointer. The results of the instructions are stored into the destinations, e.g., into the register file 130, from the instruction reorder structure 125 in program order. After an instruction is retired, the instruction may continue to occupy its entry in the reorder structure 125 with an indication that the entry is available until the entry is allocated to a new instruction. To indicate that an entry is available, the waiting bit 156, the issued bit 158, and the finished bit 160 may be deasserted to indicate that the instruction has retired.

The loop processing controller 105 detects whether a loop exists in the ordered list of instructions maintained by the instruction reorder structure 125. A loop may be defined by an instruction that contains syntax reflecting the beginning of the loop, such as a "for" or "while" statement. Alternatively, a loop may be defined by a branch instruction or a jump instruction having a target instruction that occurs earlier in the instruction sequence. The target instruction is the first instruction of the loop, and the branch or jump instruction is the last instruction of the loop. The target instruction may not itself indicate that it is the first instruction of the loop, since the branch instruction or jump instruction defines the loop by directing program execution to the target instruction. The number of instructions in the loop is the difference between the address of the target instruction and the address of the branch instruction or the jump instruction.

Whether a branch instruction is taken or not taken is typically not determined until an execution unit 135 has executed the branch instruction. Furthermore, the address of the target instruction associated with the branch instruction or jump instruction may not be known until the branch instruction or the jump instruction is executed. In those instances, the execution unit 135 provides the loop processing controller 105 with information relating to the outcome of the branch instruction or jump instruction and the address of the target instruction so that the loop processing controller 105 can detect whether a loop is present in the reorder structure 125.

The loop processing controller 105 may predict whether a branch instruction will or will not be taken before execution of the branch instruction. The branch instruction may be provided to the loop processing controller 105 by the instruction decode unit 120 for branch prediction. Alternatively, the loop processing controller 105 may detect when a branch instruction is dispatched to the reorder structure 125 and perform branch prediction on the branch instruction. The loop processing controller 105 may use static branch prediction, dynamic branch prediction, or other branch prediction techniques to predict whether a branch instruction will or will not be taken. In static branch prediction, a prediction is included within the branch instruction by, for example, including a bit in the branch instruction that indicates whether the branch instruction is likely to be taken. The bit is set by a compiler based on either heuristics or feedback from program execution. By reading this bit of the instruction, the loop processing controller 105 may predict whether a branch instruction will or will not be taken prior to execution. In dynamic branch prediction, branch statistics are collected in data structures, for example, in branch history tables (BHTs), or in separate bits in the instruction cache or memory. To enable dynamic branch prediction, the loop processing controller 105 may include data structures for collecting branch statistics and may use these statistics to predict whether a branch instruction will or will not be taken.

When a branch instruction is taken or predicted to be taken, the loop processing controller 105 determines whether the target instruction is present in the reorder structure 125. If the target instruction is present in the reorder structure 125, a loop exists in the reorder structure 125. Furthermore, when a jump instruction is executed, the loop processing controller 105 determines whether the target instruction is present in the reorder structure 125. If the target instruction is present in the reorder structure 125, a loop exists in the reorder structure 125.

When the loop processing controller 105 detects a loop in the reorder structure 125, the loop processing controller 105 determines from the instructions the information needed for managing the loop instructions. The information may include the number of instructions in the loop and the number of iterations of the loop. When a loop is present in the reorder structure 125 and the number of iterations of the loop is known, or the starting and ending points in the loop are known, the loop may be executed from the reorder structure 125. Because the sequence of instructions forming the loop is available to the execution units 135 from the reorder structure 125, there is no need to perform instruction cache access or instruction decoding while the loop is executed from the reorder structure 125. Components of the processor 100 before the reorder structure 125 in the pipeline may be disabled, such as the instruction cache 110, the instruction fetch unit 115, or the instruction decode unit 120. Upon exiting the loop, the components may be enabled again, and instruction fetch and decode may resume.

Components of the processor may be disabled by controlling the clock signal that is delivered to the component. By maintaining the input clock signal at either a constant high or a constant low, state registers in the component are suspended from latching new values and the logic blocks between state registers are placed in a stable state. Once the components are placed in a stable state, the transistors in the state registers and the logic blocks are suspended from changing states and therefore do not consume power required to transition states. In some embodiments, when a component is disabled by controlling the clock signal, a bias voltage is applied to the component to further reduce power consumption resulting from leakage. Alternatively, components of the processor may be disabled by turning off power to the components.

Figure 3:
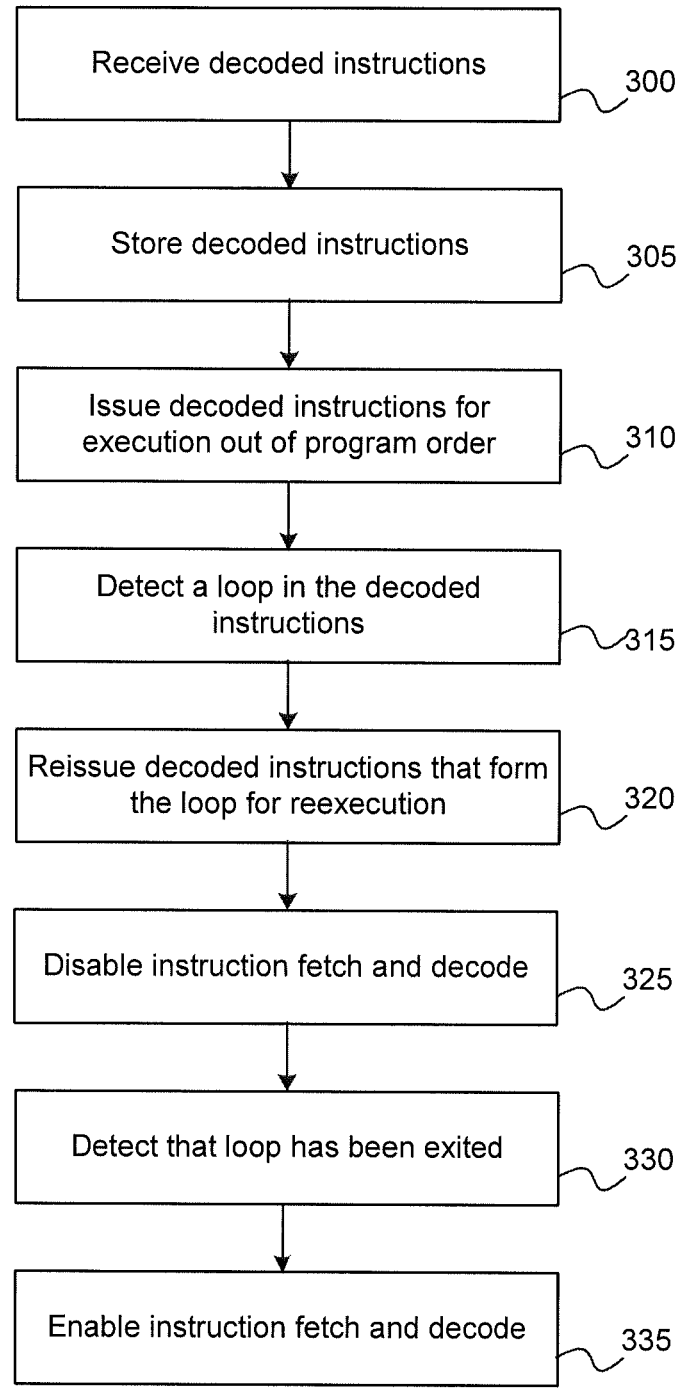
FIG. 3 is a flowchart of examples of operations performed when processing loop instructions.

A method for processing loop instructions (e.g., in the processor 100 shown in FIG. 1) is represented in FIG. 3, which is a flowchart showing examples of operations performed by a processor while processing instructions that include a loop. When an instruction reorder structure receives decoded instructions from an instruction decode unit at 300, the instruction reorder structure stores the decoded instructions at 305. To store an instruction, an entry or storage location in the instruction reorder structure is allocated to the instruction. The status of each instruction may be tracked using one or more bits in each entry of the instruction reorder structure, e.g., using the bits described with reference to FIG. 2.

At 310, the decoded instructions are issued from the instruction reorder structure for execution by the execution units. One or more instructions may be issued at a time, and the instructions may be issued out of program order.

At 315, a loop processing controller detects a loop in the decoded instructions stored in the instruction reorder structure. The loop processing controller can perform loop detection either after the decode stage or after the execution stage. To perform loop detection after the decode stage, the loop processing controller predicts a target address from a decoded branch or jump instruction. To perform loop detection after the execution stage, the loop processing controller uses the computed target address of an executed branch or jump instruction.

Figure 4:
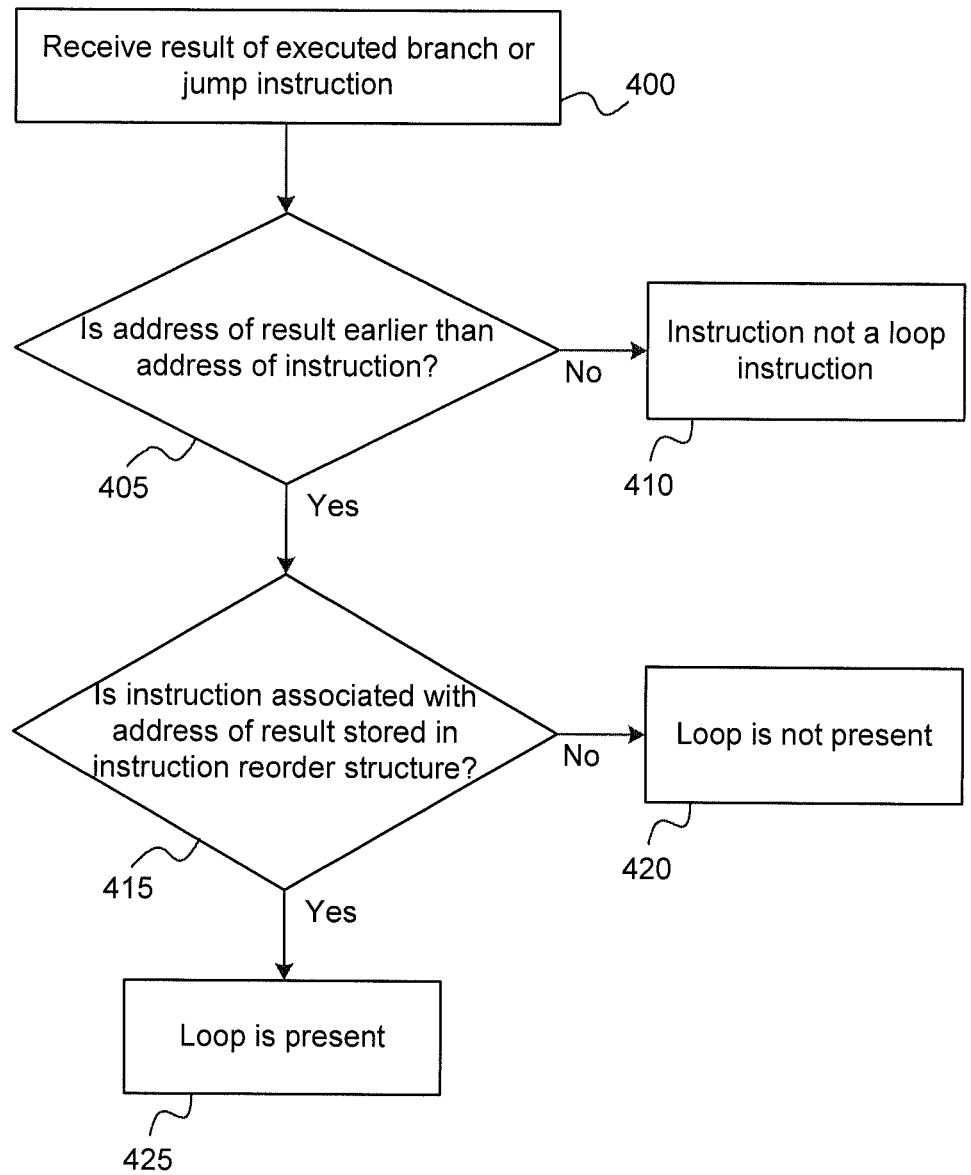
FIG. 4 is a flowchart of examples of operations performed by the loop processing controller.

FIG. 4 is a flowchart showing examples of operations performed by the loop processing controller to detect a loop in the decoded instructions after the instruction has been executed. To enable loop detection, the loop processing controller may receive information from the execution units, such as a result of an executed branch or jump instruction, at 400. The execution unit may provide the outcome of the branch instruction or jump instruction, e.g., whether the branch or jump was taken or not taken, and the address of the target instruction. From the information received from the execution units, the loop processing controller determines whether the address of the result, e.g., the address of the target instruction, occurs earlier than the address of the executed branch or jump instruction at 405. To make this determination, the loop processing controller compares the address of the result with the address of the executed instruction. If the address of the result does not occur earlier, the executed instruction may be determined to not be a loop instruction at 410.

If the address of the result occurs earlier than the address of the executed instruction, the instruction associated with the address of the result and the executed instruction form the beginning and end of a loop. At 415, the loop processing controller determines whether the instruction associated with the address of the result is stored in the instruction reorder structure. The loop processing controller may make this determination by searching the instruction reorder structure for the address of the result, e.g., by comparing an instruction address field of each entry of the reorder structure with the address of the result to locate a match. If the address of the result is not present in the instruction reorder structure, the instruction reorder structure is determined to not be storing the instruction associated with the address of the result and thus is determined to not be storing all of the instructions of the loop at 420. If the address of the result is present in the instruction reorder structure, the instruction reorder structure is determined to be storing the instruction associated with the address of the result and thus is determined to be storing all of the instructions of the loop at 425.

Referring again to FIG. 3, when the loop processing controller detects that a loop is present in the instruction reorder structure, the loop processing controller causes the instruction reorder structure to reissue the stored instructions that form the loop for re-execution by the execution units at 320. The loop processing controller may cause the instruction reorder structure to reissue the loop instructions by, for example, setting the bits of the entries associated with the loop instructions to indicate that the instruction stored in that entry is waiting to be executed. While the loop instructions are being re-executed from the instruction reorder structure, components of the processor before the reorder structure in the pipeline may be disabled at 325, such as an instruction cache, an instruction fetch unit, or an instruction decode unit. In some implementations, the instruction cache is disabled only after a number of instructions following the loop are made available in the instruction cache. By disabling the instruction cache only after a number of instructions are stored in the instruction cache, instructions may be provided to the execution units more quickly when the loop is exited. The number of instructions to store in the instruction cache before disabling the instruction cache may be preprogrammed into the processor. Alternatively, the number of instructions to store in the instruction cache may depend on the state of the components in the processor. For example, the number of instructions may be the number of reorder structure entries that are not occupied by an instruction in flight.

At 330, the loop processing controller detects that the loop has been exited. The loop processing controller may detect that the loop has been exited by, for example, using similar operations as those shown in FIG. 4 for detecting a loop in the reorder structure. For example, the loop processing controller receives the result of the re-execution of the last instruction in the loop, which may be the branch or jump instruction that the loop processing controller used to detect the loop. The result of the re-execution may include the outcome of the branch instruction or jump instruction, e.g., whether the branch or jump was taken or not taken, and the address of the target instruction. If the branch or jump instruction was taken, the loop processing controller determines from the result whether the address of the target instruction occurs earlier than the re-executed instruction. If the address of the result occurs earlier, the loop is being reiterated. If the branch or jump instruction was not taken, the loop has been exited. If the address of the result does not occur earlier than the re-executed instruction, e.g., the address of the result is the next sequential instruction in program order, the loop has been exited. Upon detecting that the loop has been exited, the components that were previously disabled are re-enabled at 335.

Alternatively, the loop processing controller may detect that the loop has been exited by, determining from a loop instruction a number of iterations of the loop. After each iteration of the loop, the loop processing controller decrements the number of iterations. When the number of iterations reaches zero, the last iteration of the loop has been completed, and the loop has been exited.

While this disclosure contains many specifics, these should not be construed as limitations on the scope of what may be claimed, but rather as descriptions of features that may be specific to particular implementations. It will be understood that various modifications may be made without departing from the scope of the following claims. For example, one or more of the steps of the methods described above can be performed in a different order (or concurrently) and still achieve desirable results. Accordingly, other implementations are within the scope of the following claims.

What is claimed is:

1. A method comprising:
   storing, according to program order, decoded instructions including instructions that form a loop in an instruction reorder structure;
   issuing the decoded instructions from the instruction reorder structure for execution out of program order;
   detecting the loop in the decoded instructions stored in the instruction reorder structure; and
   reissuing the instructions that form the loop from the instruction reorder structure for re-execution.

2. The method of claim 1, wherein detecting the loop in the decoded instructions stored in the instruction reorder structure comprises:
   receiving a result of an executed instruction from an execution unit;
   determining that an address of the result occurs earlier than an address of the executed instruction; and
   determining that an instruction associated with the address of the result is stored in the instruction reorder structure.

3. The method of claim 1, further comprising:
   disabling a component that provides instructions to the instruction reorder structure while loop instructions are re-executed from the instruction reorder structure.

4. The method of claim 3, further comprising:
   detecting the loop has been exited; and
   re-enabling the component.

5. The method of claim 4, wherein detecting the loop has been exited comprises:
   receiving a result of an executed instruction from an execution unit; and
   determining that an address of the result is associated with a next sequential instruction following the executed instruction in program order.

6. The method of claim 4, wherein detecting the loop has been exited comprises:
   determining from a loop instruction a number of iterations of the loop;
   decrementing the number of iterations upon completion of each loop iteration; and
   detecting the loop has been exited when the number of iterations reaches zero.

7. The method of claim 1, further comprising:
   storing execution results in the instruction reorder structure; and
   writing the execution results from the instruction reorder structure into a register file according to program order.

8. An apparatus comprising:
   an instruction reorder structure configured to
      store decoded instructions including instructions that form a loop according to program order, and
      issue the decoded instructions for execution out of program order; and
   a loop processing controller configured to detect the loop in the decoded instructions stored in the instruction reorder structure, and cause the instruction reorder structure to reissue the instructions that form the loop for re-execution.

9. The apparatus of claim 8, wherein the loop processing controller is further configured to disable one or more components during re-execution of loop instructions from the instruction reorder structure.

10. The apparatus of claim 8, wherein the loop processing controller is further configured to detect that the loop has been exited.

11. The apparatus of claim 8, wherein the loop processing controller is further configured to determine a number of instructions in the loop and a number of iterations of the loop.

12. The apparatus of claim 8, wherein the instruction reorder structure is further configured to store execution results and write the execution results into a register file according to program order.

13. The apparatus of claim 8, wherein the instruction reorder structure includes a plurality of storage locations, and each of the storage locations is configured to store one decoded instruction.

14. The apparatus of claim 13, wherein each of the storage locations includes a bit, and the loop processing controller is further configured to set the bit of each storage location associated with each loop instruction to indicate that the decoded instruction stored in the storage location is to be re-executed.

15. A system comprising:
an instruction cache configured to receive instructions from main memory;
instruction fetch circuitry configured to fetch the instructions from the instruction cache;
instruction decode circuitry configured to receive and decode the instructions from the instruction fetch circuitry;
an instruction reorder structure configured to
store decoded instructions including instructions that form a loop according to program order, and
issue the decoded instructions for execution out of program order; and
a loop processing controller configured to detect the loop in the decoded instructions stored in the instruction reorder structure, and cause the instruction reorder structure to reissue the instructions that form the loop for re-execution.

16. The system of claim 15, further comprising execution circuitry configured to:
receive the decoded instructions from the instruction reorder structure;
execute the decoded instructions; and
convey an execution result associated with the decoded instruction to the instruction reorder structure.

17. The system of claim 15, further comprising:
a register file configured to receive an execution result from the instruction reorder structure according to program order.

18. The system of claim 15, wherein the instruction cache is disabled during execution of loop instructions from the instruction reorder structure.

19. The system of claim 18, wherein the instruction cache is disabled by causing a clock signal value provided to the instruction cache to remain constant.

20. The system of claim 18, wherein the instruction cache is disabled by adjusting a voltage supplied to the instruction cache.

* * * * *